April 16, 1929.  P. R. WILEY  1,709,421
PARKING DOLLY
Filed May 9, 1928.  2 Sheets-Sheet 2
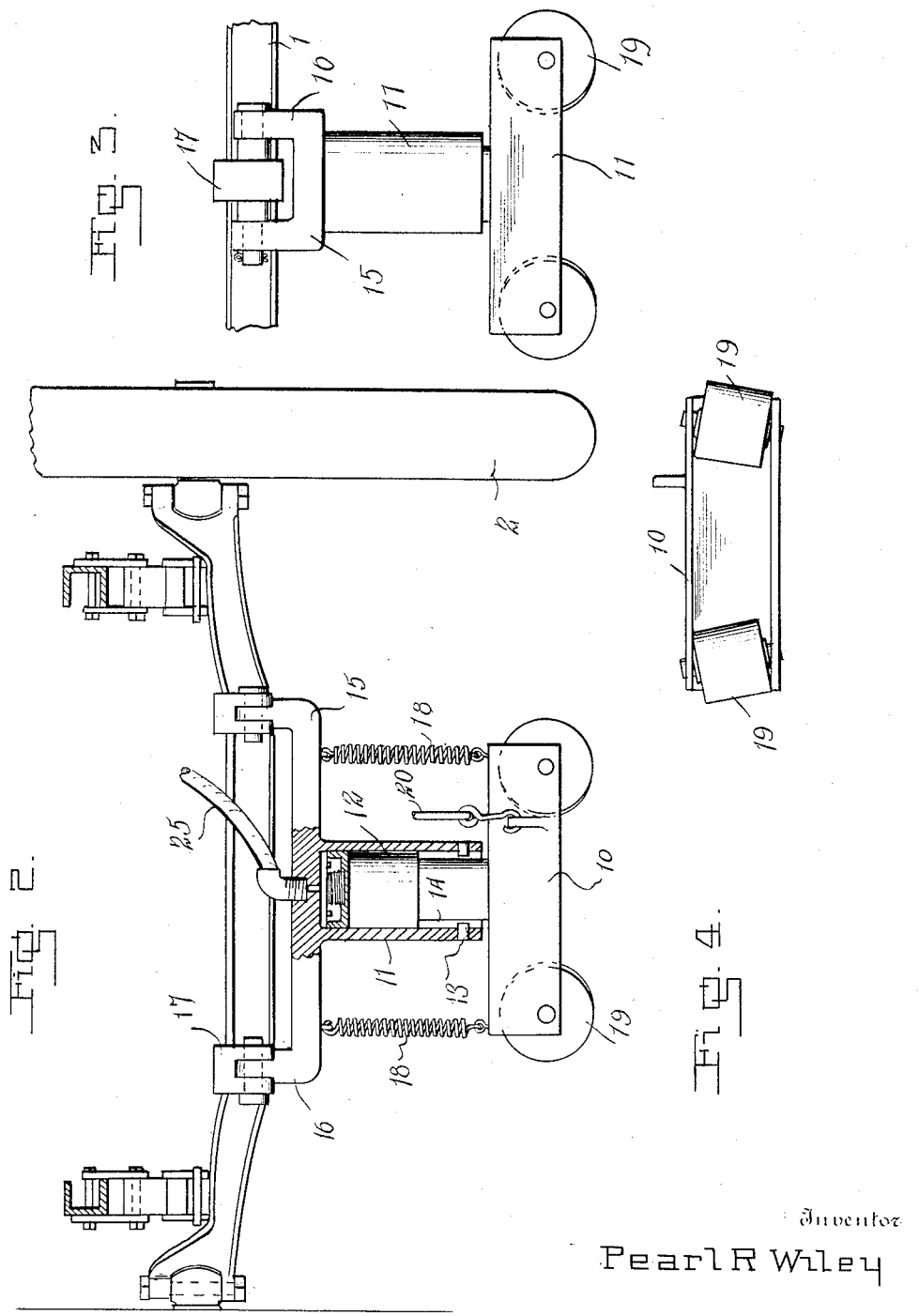
Inventor
Pearl R Wiley
By Lacey & Lacey, Attorneys Patented Apr. 16, 1929.

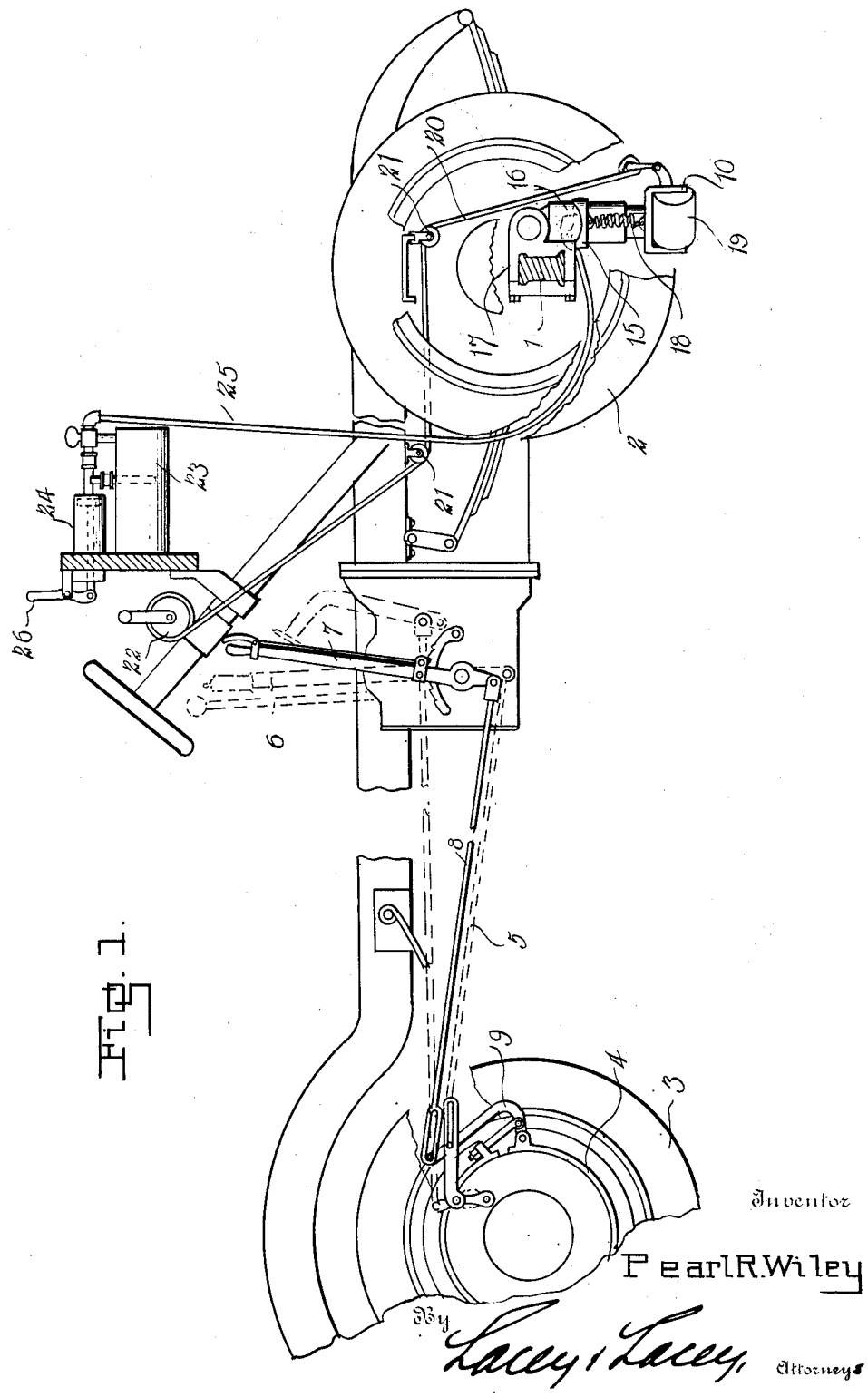

1,709,421

UNITED STATES PATENT OFFICE.

PEARL R. WILEY, OF LOS ANGELES, CALIFORNIA.

PARKING DOLLY.

Application filed May 9, 1928. Serial No. 276,482.

This invention relates to the parking of motor vehicles, so as to economize space in congested districts, and provides simple and effective means susceptible of application to vehicles in use and on the market without requiring any change in the construction or the provision of parts other than those forming the attachment.

The invention provides a lifting mechanism adapted to be pivotally connected to the front axle, to be swung into and out of operative position, and comprising a cylinder and a piston therein, a pump for supplying a liquid medium to the cylinder for projecting the piston and elevating the front wheels of the vehicle, and means for setting the brakes on the rear right wheel to cause the vehicle to pivot thereon when power is applied to the left rear wheel to move the front of the vehicle toward the curb.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof reference is to be had to the following description and the drawings hereto attached, in which:

Figure 1 is a side view of the chassis of a motor vehicle provided with parking mechanism embodying the invention.

Figure 2 is a front view of the chassis and parking dolly, partly in section.

Figure 3 is a front view of a modification.

Figure 4 is an inverted view of the dolly base.

Corresponding and like parts are referred to in the following description and designated in the several views of the drawings by like reference characters.

In the drawings, wherein, for the purpose of illustration, is shown a preferred embodiment of the invention, the numeral 1 denotes the front axle of the chassis of a motor vehicle. The front wheels are designated by the numeral 2 and the rear wheels by the numeral 3. The numeral 4 designates the brake band coacting with the brake drum associated with each of the rear wheels. The rear brakes are adapted to be set in the usual way by means of a rod 5 and lever 6. In addition, there is provided a lever 7 which is connected by means of a rod 8 to an element 9 whereby to apply the brakes to the rear right wheel to prevent movement thereof and cause the vehicle to pivot thereon when parking. It is observed that the connecting means between the ordinary lever 6 and the parking lever 7 includes a sliding connection, as indicated most clearly in Figure 1 of the drawings, whereby either one of the levers may be operated indpendently of the other to apply the brake as required.

The dolly mechanism includes a base 10, a cylinder 11, and a piston 12 operable within the cylinder and prevented from turning therein by a pin and groove connection, the pin 13 projecting inwardly from the cylinder and entering a groove 14 formed in a side of the piston. This pin and groove connection also prevents displacement of the piston by limiting its outward or downward movement. A head 15 at the upper end of the cylinder 11 may be short, as indicated in Figure 3, or long as shown in Figure 2, and is provided with terminal lugs 16 which are pivotally connected to a clamp 17 secured to the front axle 1 intermediate the ends thereof whereby to centralize the dolly.

Contractile springs 18 constitute yieldable connections between the base 10 and head 15 and serve to normally hold the piston within the cylinder. Small wheels 19 are mounted upon the base 10 and their axes flare to conform approximately to radii of the circle in which the front of the vehicle moves when parking. Normally, the dolly is held elevated so as to be out of the way and for this purpose a flexible connection 20 such as a cord, cable, or chain, is attached to the base 10, and after passing over suitably positioned guide pulleys 21, extends within convenient reach of the driver to be manipulated for lowering or raising the dolly. For convenience, a reel 22 is provided and mounted upon the steering column or other convenient portion of the vehicle.

The numeral 23 denotes a conveniently positioned tank for holding a liquid, and 24 indicates a pump for drawing the liquid from the tank 23 and forcing it through a pipe 25 into the upper end of the cylinder 11, whereby to effect an outward movement of the piston and a lifting of the front end of the vehicle to cause the front wheels 2 to clear the ground. The pump is adapted to be operated by means of a lever 26. The arrangement is such as to provide in effect, a hydraulic mechanism for lifting the front end of the vehicle preliminary to parking.

When it is required to utilize the dolly mechanism for parking, the vehicle is parked in the accustomed way until the rear right wheel is adjacent the curb, after which the connection 20 is relaxed to permit lowering of the dolly. The pump 24 is now operated to project the piston 12 and effect a lifting of the front end of the vehicle which usually is located some distance from the curb.

After the front end of the vehicle has thus been jacked up, the parking lever 7 is operated to apply the brake to the rear right wheel and the clutch, previously released, is permitted to engage, thereby imparting a rotary movement to the left rear wheel, which causes the vehicle to pivot on the rear right wheel, with the result that the front end of the vehicle moves toward the curb, as will be readily appreciated.

It is understood that the engine is in low gear when swinging the front end of the vehicle towards the curb. When swinging the front end of the vehicle away from the curb the engine is in reverse. Obviously, the parking brake may be applied to either one of the rear wheels to meet the custom of traffic and parking.

Having thus described the invention, I claim:

A parking dolly for motor vehicles comprising axle clamps, a cylinder having a head pivoted to said clamps, a piston movable within the cylinder and having grooves therein, pins carried by the cylinder and engaged in the grooves to prevent turning of the piston in the cylinder and to limit downward movement of the piston, a base fixed to the lower end of the piston, wheels carried by the ends of the base for carrying the load when the front end of the vehicle is elevated, means for raising and lowering the dolly, a pump for supplying a fluid medium to the cylinder for projecting the piston, a tube between the pump and cylinder, and springs connecting the base and head, as and for the purpose set forth.

In testimony whereof I affix my signature.

PEARL R. WILEY. [L. S.]